United States Patent
Kanack et al.

(10) Patent No.: US 6,263,034 B1
(45) Date of Patent: Jul. 17, 2001

(54) CIRCUIT AND TECHNIQUE FOR DIGITAL REDUCTION OF JITTER TRANSFER

(75) Inventors: Bradley M. Kanack, Plano; Yi Liu, Richardson; James E. McDonald, Wylie, all of TX (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 0 days.

(21) Appl. No.: 09/047,888

(22) Filed: Mar. 25, 1998

(51) Int. Cl.[7] .................................................. H04L 7/00
(52) U.S. Cl. .............................. 375/371; 370/516; 331/14
(58) Field of Search .................................... 375/371, 372, 375/373, 375, 376; 370/516, 518; 348/536, 537, 541; 327/144; 331/14, 25

(56) References Cited

U.S. PATENT DOCUMENTS

| | | | |
|---|---|---|---|
| 4,097,697 | 6/1978 | Harman | 179/175.3 R |
| 4,777,640 | 10/1988 | Turner et al. | 375/118 |
| 4,823,360 | 4/1989 | Tremblay et al. | 375/4 |
| 5,359,630 | 10/1994 | Wade et al. | 375/106 |
| 5,481,563 | 1/1996 | Hamre | 375/226 |
| 5,535,252 | 7/1996 | Kobayashi | 375/371 |
| 5,565,928 * | 10/1996 | Saeger et al. | 348/540 |
| 5,598,443 | 1/1997 | Poeppleman | 375/359 |
| 5,668,830 * | 9/1997 | Georgiou et al. | 375/220 |
| 5,696,800 | 12/1997 | Berger | 375/361 |
| 5,719,908 | 2/1998 | Greeff et al. | 375/376 |
| 5,757,857 * | 5/1998 | Buchwald | 375/271 |
| 5,796,777 | 8/1998 | Terlep et al. | 375/227 |
| 5,878,088 | 3/1999 | Knutson et al. | 375/324 |
| 5,896,391 | 4/1999 | Solheim et al. | 371/5.1 |
| 5,991,346 | 11/1999 | Lu | 375/355 |

* cited by examiner

Primary Examiner—Young T. Tse
(74) Attorney, Agent, or Firm—Christie, Parker & Hale, LLP (57) ABSTRACT

A fully digital filter jitter reduction circuit for attenuating jitter transfer in a digital communication system or subsystem includes a digital filter which attenuates jitter transfer within a bandwidth of the filter. A single synthesized clock, from which all other required clocks are created by precessing or phase shifting with respect to the synthesized clock, is utilized to create a reduced jitter output clock. Under the control of the digital filter, the reduced jitter output clock operates an output data latch such that the output data latch performs the function of an elastic buffer. Several stages of the digital filter jitter reduction circuit can be implemented in cascade to further reduce jitter. Since jitter attenuation is a function of the input jitter amplitude, the digital filter is nonlinear in nature.

24 Claims, 4 Drawing Sheets

CIRCUIT AND TECHNIQUE FOR DIGITAL REDUCTION OF JITTER TRANSFER

BACKGROUND OF THE INVENTION

1. Field of the Invention

This invention relates generally to digital communications, and more specifically to digital reduction of jitter transfer.

2. Description of the Prior Art

In order to facilitate optimal sampling of input data in a digital communication system or subsystem, such as in a transceiver, demultiplexor or repeater circuit, jitter must generally be tracked and attenuated. Jitter may be defined as a deviation from an ideal timing event and generally arises when a digital signal varies from its ideal position in time. Jitter is typically introduced via a transmitter, transmission media, noise or combination thereof, with the predominate source of jitter being a function of the specific communication link.

There are generally two types of jitter, commonly referred to as random jitter and deterministic jitter, the sum of which yields the total jitter at a specific reference plane in a communication system. Random jitter is the result of the random nature of noise sources within any non-ideal device. Sources of random noise include, but are not limited to, thermal, shot and flicker noise. Random noise sources add, root-mean-square-wise, to generally comprise the entire random jitter contribution of a system or subsystem. The predominant random noise source is a complex function of the system or subsystem implementation and the operational bandwidth.

Deterministic jitter results from systematic sources that by their nature can be "determined". Examples of deterministic jitter include, but are not limited to, duty cycle distortion, unequal rise and fall times for the devices used in the system's implementation, dispersion due to interconnect media and distortion caused by the different frequencies which propagate through a transmission media at different phase velocities. Since high frequency components of a signal are generally attenuated more than lower frequency components of the same signal, deterministic jitter tends to be prevalent in broad bandwidth systems.

As jitter accumulates in a communication channel, it becomes difficult for a receiver to determine what digital signal was sent by a transmitter, resulting in errored bits. As the amount of jitter increases, the likelihood that the original digital signal cannot be determined correspondingly increases, typically resulting in a loss of information. In order to prevent a catastrophic loss of information, the digital signal must generally be re-timed and re-transmitted before the signal has degraded beyond acceptable levels. Once the signal has been re-timed and the jitter removed or attenuated, the signal can be re-transmitted to a subsequent site or node in a communication system or network.

Continuous monitoring and attenuation of jitter is thus important in maintaining the integrity of a data communication system. However, presently known devices and methods for attenuating jitter have been found to be unsatisfactory. In particular, conventional approaches rely upon re-timing and data recovery circuits for tracking and attenuating random and deterministic jitter. Such approaches tend to be data transmission protocol dependent and complex, resulting in higher power consumption and cost, larger size and lower system reliability. Consequently, jitter and other undesirable variations are often passed onto or transferred to the recovered clock and data.

What is needed therefore is a method and apparatus for tracking and minimizing jitter which is simple, reliable and economical.

SUMMARY OF THE INVENTION

In a first aspect, the present invention provides a jitter reduction circuit for attenuating jitter associated with a signal, including means for generating a first clock and a second clock, phase comparing means for comparing a phase of the first clock with a phase of the signal and adjusting the phase of the first clock in response thereto, means for determining relative phase offset between the first clock and the second clock and selectively changing phase a of the second clock when the phase offset exceeds a tracking range and means for re-timing the signal according to the second clock.

In another aspect, the present invention provides a method for attenuating jitter associated with a signal, including the steps of generating a first clock and a second clock, comparing a phase of the first clock with a phase of the signal and adjusting the phase of the first clock in response thereto, determining relative phase offset between the first clock and the second clock and selectively a changing phase of the second clock when the phase offset exceeds a tracking range and re-timing the signal according to the second clock.

These and other features and advantages of this invention will become further apparent from the detailed description and accompanying figures that follow. In the figures and description, numerals indicate the various features of the invention, like numerals referring to like features throughout both the drawing figures and the written description.

DETAILED DESCRIPTION OF THE PREFERRED EMBODIMENT(S)

Figure 1:
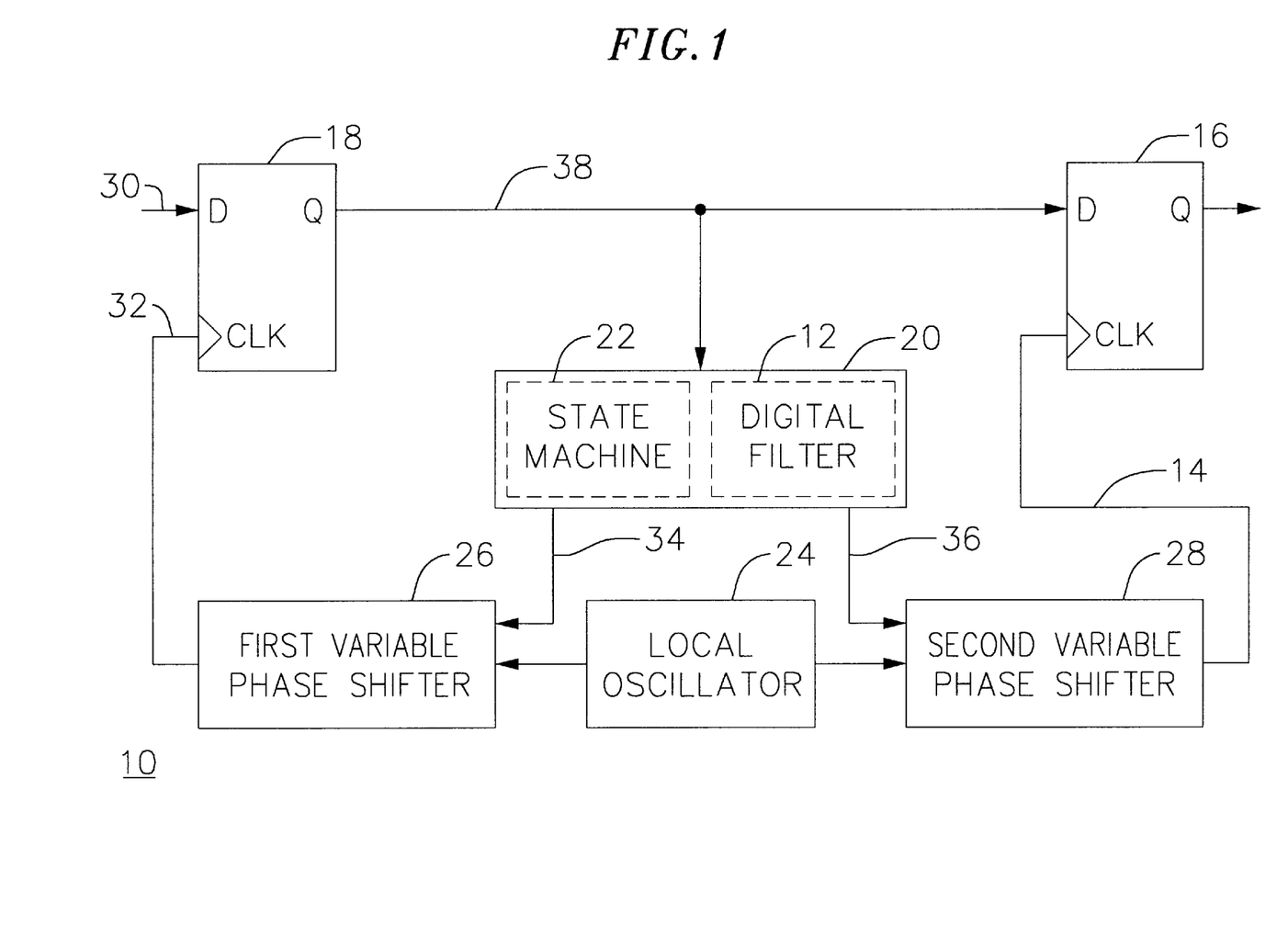
FIG. 1 is a block diagram of a jitter reduction circuit for tracking and attenuating jitter according to the present invention.

Referring to FIG. 1, filter jitter reduction circuit 10 for attenuating jitter transfer in digital communication system or subsystem is illustrated. As described in detail below, digital filter 12 attenuates jitter transfer within a bandwidth of digital filter 12. The level of attenuation depends upon the exact implementation of the present invention and the amplitude of the input jitter. Under the control of digital filter 12, reduced jitter output clock 14 operates output data latch 16 such that output data latch 16 performs the function of an elastic buffer. Several stages of digital filter jitter reduction circuit 10 can be implemented in cascade to further reduce jitter. Since jitter attenuation is a function of the input jitter amplitude, digital filter 12 is nonlinear in nature.

For illustrative purposes, digital filter jitter reduction circuit 10 is described with respect to its implementation in a repeater circuit. The present invention is not limited to use in a repeater circuit, but rather may be utilized to reduce jitter in any circuit, particularly those where it is desirable to regenerate digital signals. Such circuits may include, but are not limited to, conventional and newly developed demultiplexor and receiver/transceiver circuits.

Referring to FIG. 1, a schematic representation of filter jitter reduction circuit 10 for attenuating jitter transfer is illustrated. Filter jitter reduction circuit 10 includes input data sampling latch 18, output data latch 16, state machine/digital filter processor 20 including state machine 22 and digital filter 12, local oscillator 24, first variable phase shifter 26 and second variable phase shifter 28. Local oscillator 24 is free running with respect to the frequency of input data signal 30. When there is a frequency offset between the frequency of input data signal 30 and local oscillator 24, a constant precession of taps of local oscillator 24 in one direction synthesizes a new clock, i.e. data sampling clock 32, which locks to input data signal 30. A precession at a constant rate in one direction synthesizes a new frequency in local oscillator 24, resulting in a frequency shift. The current phase of first variable phase shifter 26 thereby synthesizes data sampling clock 32 whose frequency is locked to input data signal 30.

Control codes 34 generated by state machine 22 enable first variable phase shifter 26 to provide phase selection for local oscillator 24. Filtered control codes 36 generated by digital filter 12 enable second variable phase shifter 28 to provide phase selection for local oscillator 24. In particular, control for second variable phase shifter 28 is provided by digital filter 12, which initially determines the phase difference between data sampling clock 32 and reduced jitter output clock 14. Thus, the current phase selections of data sampling clock 32 and current reduced jitter output clock 14 are compared. Digital filter 12 generates filtered control codes 36 which provides for further precessing of reduced jitter output clock 14 when the difference between the phase selections of data sampling clock 32 and reduced jitter output clock 14 exceeds a predetermined tracking range m. Filtered control codes 36 allow precession of reduced jitter output clock 14 in the same direction as data sampling clock 32 to maintain generally the same maximum separation when the phase difference exceeds tracking range m. When the difference between the current phase selections of data sampling clock 32 and reduced jitter output clock 14 is equal to or less than tracking range m, filtered control code 36 does not provide for further precessing of reduced jitter output clock 14. In such case, the current phase selection for reduced jitter output clock 14 is maintained. Digital filter 12 thus provides filtered control codes 36 for phase shifting reduced jitter output clock 14 when the difference between phase selections of data sampling clock 32 and reduced jitter output clock 14 exceeds tracking range m. Filtered control codes 36 provided by digital filter 12 allow selection from an n-number of possible phase quantitizations or selections.

Figure 2:
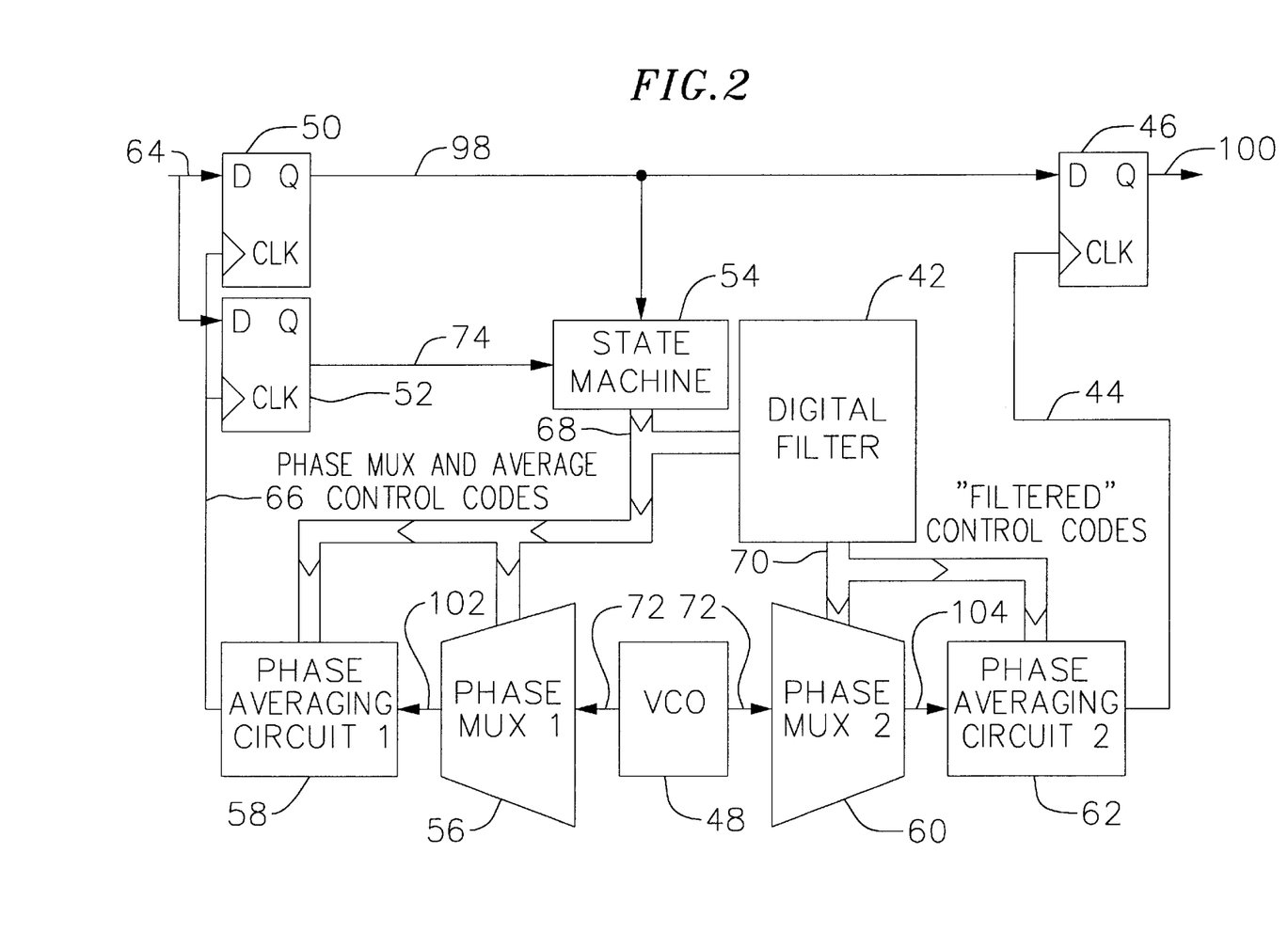
FIG. 2 is a detailed block diagram of a jitter reduction circuit for tracking and attenuating jitter according to the present invention.

Referring to FIG. 2, a fully digital implementation of digital filter jitter reduction circuit 40 for attenuating jitter transfer in a digital communication system or subsystem is illustrated. As described in detail below, digital filter 42 attenuates jitter transfer within a bandwidth of digital filter 42. The level of attenuation depends upon the exact implementation of the present invention and the amplitude of the input jitter. Under the control of digital filter 42, reduced jitter output clock 44 operates output data latch 46 such that output data latch 46 performs the function of an elastic buffer. Several stages of digital filter jitter reduction circuit 40 can be implemented in cascade to further reduce jitter. Since jitter attenuation is a function of the input jitter amplitude, digital filter 42 is nonlinear in nature.

For illustrative purposes, digital filter jitter reduction circuit 40 is described with respect to its implementation in a repeater circuit. The present invention is not limited to use in a repeater circuit, but rather may be utilized to reduce jitter in any circuit, particularly those where it is desirable to regenerate digital signals. Such circuits may include, but are not limited to, conventional and newly developed demultiplexor and receiver/transceiver circuits. Referring to FIG. 2, a schematic representation of filter jitter reduction circuit 40 for attenuating jitter transfer is illustrated. Filter jitter reduction circuit 40 includes voltage controlled oscillator (VCO) 48, input data sampling latch 50, transition sampling latch 52, state machine 54, first phase multiplexor 56, first phase averaging circuit 58, digital filter 42, second phase multiplexor 60, second phase averaging circuit 62 and output data latch 46.

VCO 48, which constitutes the local clock, is free running with respect to the frequency of input data signal 64. When there is a frequency offset between the frequency of input data signal 64 and VCO 48, a constant precession of taps of VCO 48 in one direction synthesizes a new clock, i.e. data sampling clock 66, which locks to input data signal 64. A precession at a constant rate in one direction synthesizes a new frequency in VCO 48, resulting in a frequency shift. The phase difference between input data signal 64 and data sampling clock 66 is used to adjust the frequency of VCO 48 allowing locking of VCO 48 to the frequency and phase of incoming input data signal 64. In a typical configuration, VCO 48 generates a predetermined number of phases of reference clock signal (not shown) in the form of clock signals 66 which are applied to the inputs of first and second phase multiplexors 56 and 60. These phases of reference clock signal may spaced at known phase intervals. Those skilled in the art will recognize that alternative numbers of phase outputs and spacings therebetween could also be used to accommodate the particular requirements of filter jitter reduction circuit without departing from the scope of the present invention. Control codes 68 generated by state machine 54 enable first phase multiplexor 56 to provide phase selection for VCO 48 and filtered control codes 70 generated by digital filter 42 enable second phase multiplexor 60 to provide phase selection for VCO 48 as explained in detail below.

Input data signal 64, typically encoded in a non-return to zero (NRZ) format, is applied to D-input of data and transition sampling latches 50 and 52, both of which are clocked by data sampling clock 66. NRZ input data signal 64 is a two-state signal which assumes either a "positive" or "negative" state, corresponding to a binary "1" or "0", respectively. Encoding of data in the NRZ format allows clock and data information to be transmitted over the same medium and is typically preferable to limit the maximum fundamental frequency needed to transmit, which is generally ½ the clock rate. The present invention is not limited to tracking and attenuating jitter for NRZ encoded data, however, but rather can be adapted for use with any digital data stream, including non-binary formats, requiring clock recovery and retransmission. For example, such data formats include, but are not limited to, non-return to zero inverted (NRZI), DS1, DS-2 and DS-3 formats.

In accordance with the present invention, input data signal 64 is initially compared to a current phase quantization or tap, realized in data sampling clock 66. Data sampling clock 66 is generated by phase shifting or precessing synthesized clock signal 72 generated by VCO 48 via first phase multiplexor 56 and first phase averaging circuit 58. The phase difference between input data signal 64 at a transition and current phase quantization or tap is determined. Based upon the phase offset, state machine 54 determines whether the current phase quantization or tap selection needs to be adjusted and if so, in which direction, i.e. forward or earlier (backward or later), in order to phase lock data sampling clock 66 to input data signal 64.

The phase difference between input data signal 64 and current phase quantization state or tap is preferably determined utilizing two times oversampling of input data signal 64. Input data signal 64 is sampled at each transition, i.e. on each clock edge, to determine whether the edge is in phase with the current phase of data sampling clock 66. A transition occurs when there is a change in voltage level of the input data signal 64, typically occurring when input data signal 64 changes binary state. Data sampling clock 66 is thus compared to input data signal 64, upon a transition from 1 to 0 or 0 to 1.

Input data signal 64 is oversampled on both clock edges and a data bit memory depth generated. If the edge of input data signal 64 is early or late with respect to the current data sampling clock 66, VCO 48 frequency will be phase shifted via first phase multiplexor 56 and first phase averaging circuit 58.

Figure 3A:
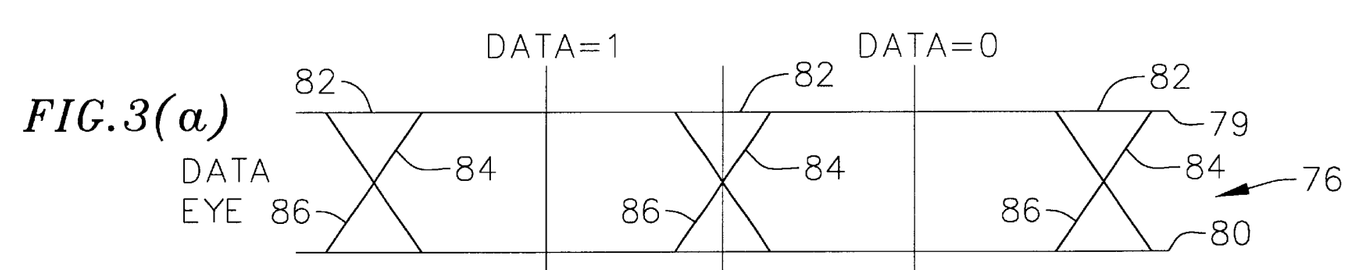
FIG. 3(a) is a graph showing an input data signal including data transitions.
Figure 3B:
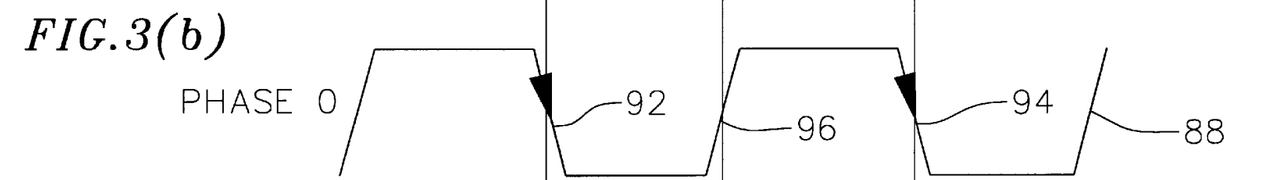
FIG. 3(b) is a graph showing a phase "0" sampling clock signal for sampling the input data signal illustrated in FIG. 3(a).
Figure 3C:
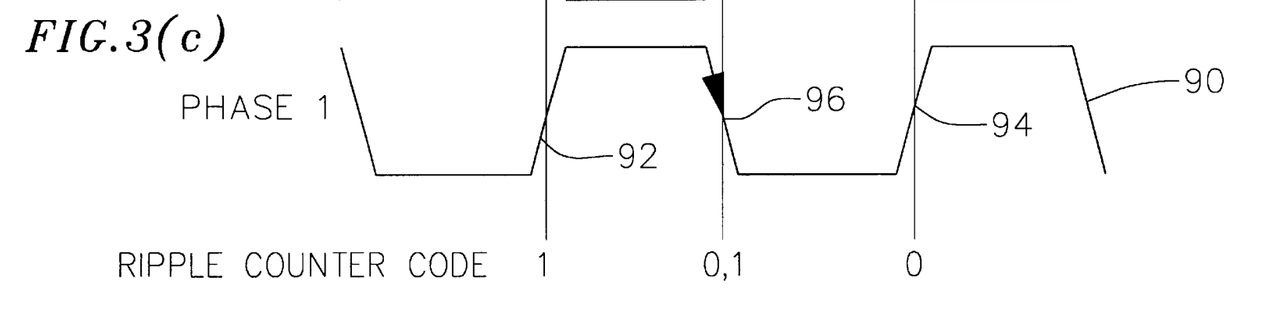
FIG. 3(c) is a graph showing a phase "1" sampling clock signal for sampling the input data signal illustrated in FIG. 3(a).

For example, referring to FIG. 3(a)–(c), one sample is shared equally between two bits, whereas one sample is optimally in the center of the data bit or data eye. The data eye is the time interval beginning at an instant of possible data transition and continuing for one bit time. Each phase of data sampling clock 66 is compared to the possible occurrence of a phase related input data signal transition such that the phases of the clock transitions are adjusted to be nominally centered midway between the data transitions, that is, in the middle of the data eye. In particular, referring to FIGS. 1 and 3(a), the waveforms represent a stream of digital data 76 with the two voltage levels 78 and 80 represented by the two horizontal lines. The "X's" represent data transitions 82. For illustrative purposes, both the high and low voltage levels are shown. Assuming input data signal 64 to data and transition sampling latches 50 and 52 contains a sequence of consecutive binary 1's or 0's, the portion of the "X's" which slope upward 84 towards the right represents a transition from low to high voltage (Data=1). Correspondingly, the oppositely sloped portion 86 of the "X's" represents a transition from high to low voltage (Data=0). Referring to FIG. 3(b)–(c), sampling clocks 88 and 90 (phase 0 and phase 1, respectively) are 180 degrees out of phase with each other, generating first and third bits, "1" and "0", at transitions 92 and 94, respectively. Center sampling transition 96 generates a second bit of "0" or "1". The state of the second bit depends on various factors, such as the presence or absence of random noise, jitter and the exact phase increment.

The three bits generated by two times oversampling are utilized to determine the phase offset between input data signal 64 and data sampling clock 66. When data sampling clock 66 is late relative to input data signal 64, the phase offset from two times oversampling is "100" or "011". After receiving a phase offset indicating a late sampling clock for a consecutive predetermined number of times, state machine 54 generates a control code 68 for adjusting data sampling clock 66 such that it is advanced by one tap selection. When data sampling clock 66 is early, phase offset from two times oversampling is "001" or "110". After receiving a phase offset indicating an early sampling clock for a consecutive predetermined number of times, state machine 54 generates a control code 68 for adjusting data sampling clock 66 such that it is slowed by one tap selection. Finally, when there is no relative phase information, phase offset from two times oversampling is "111", "000", "010" or "101" and current phase quantization or tap is maintained.

State machine 54 thus determines whether data sampling clock 66 is early or late based upon the combination of data sampling latch 50 and transition sampling latch 52. Data input signal 64 is sampled initially by data sampling latch 50, then transition sampling latch 52 and then data sampling latch 50. Data sampling clock 66 is thus actually two clocks which are inverses of each other, that is, after one clocks samples, the other clock samples 180 degrees later. Referring to FIG. 3(a), for example, upon the falling edge (negative edge triggered) of data sampling clock 88, existing data value of input data signal 76 at D-input of data sampling latch 50 is latched and appears at Q-output of data sampling latch 50. Q-output of data sampling latch 50, data center signal 98, is coupled to state machine 54. Data center signal 98 is also coupled to D-input of output data latch 46, which in turn is clocked by reduced jitter output clock 44, to generate output signal 100. Upon the falling edge of data sampling clock 66, one-half period later, the data value of input data signal 64 is latched into transition sampling latch 52 and appears at Q-output of transition sampling latch 52. Q-output of transition sampling latch 52, transition center signal 74, is coupled to state machine 54. Data center signal 98 and transition center signal 74 are utilized to determine the phase offset or difference between input data signal 64 and data sampling clock 66. Another one-half period later, the existing data value of input data signal 64 at D-input of data sampling latch 50 is latched and appears at Q-output of data sampling latch 50, generating another data center signal 98.

Data sampling, transition sampling and output data latches 50, 52 and 46 may be D-type flip-flops, sample-and-hold circuitry, or other suitable latching. For illustrative purposes, the present invention is illustrated with sampling of input data signal 64 upon a falling edge (negative edge triggered). The present invention is not limited to such a configuration, however, but rather may be sampled alternatively upon a rising edge (positive edge triggered) as well.

Although two times oversampling of the input data signal 64 is preferred to determine the phase offset or difference, the present invention may be utilized with conventional as well as newly developed means for determining the phase offset or difference between input data signal 64 and data sampling clock 66.

Referring to FIG. 2, the phase offset is determined by data center signal 98 and transition center signal 74, preferably in the form of a three-bit phase code as described above. In response to the phase offset, state machine 54 determines whether data sampling clock 66 is early, late or on time with respect to input data signal 64, providing control codes 68 for phase shifting data sampling clock 66 if necessary. Thus, based upon the phase offset, state machine 54 decides if the current phase quantization state or tap needs to be changed and if so, in which direction, i.e. forward or earlier, backward or later, in order to phase lock data sampling clock 66 with input data signal 64.

In a typical configuration, transceiver includes thirty-two phase quantization states or taps, separated by 11.25 degrees each. For a phase offset indicating no relative phase information, i.e. a phase code of "111", "000", "010" or "101", the current phase quantization state is maintained. Correspondingly, the selected control codes 68 for first phase multiplexor 56 and first phase averaging circuit 58 remain unchanged.

When the phase offset indicates that data sampling clock 66 is late relative to input data signal 64, i.e. a phase code of "100" or "011", for a consecutive predetermined number of times, state machine 54 generates control codes 68 which are applied to first phase multiplexor 56 and first phase averaging circuit 58 for adjusting the current phase quantization state. Correspondingly, first phase multiplexor 56 and first phase averaging circuit 58, responsive to control codes 68, select one of a plurality of phase quantization states or taps to speed up the phase of data sampling clock 66 such that it matches input data signal 64. In operation, first phase multiplexor 56 and first phase averaging circuit 58 typically increases data sampling clock 66 by one phase quantization state or tap after a plurality of phase offsets, preferably a minimum of sixteen transitions, indicate data sampling clock 66 is late relative to input data signal 64.

Similarly, when the phase offset indicates that data sampling clock 66 is early relative to input data signal 64, i.e. a phase code of "001" or "110", for a consecutive predetermined number of times, state machine 54 generates control codes 68 which are applied to first phase multiplexor 56 and first phase averaging circuit 58 for adjusting the current phase quantization state or tap. Correspondingly, first phase multiplexor 56 and first phase averaging circuit 58, responsive to control codes 68, select one of a plurality of phase quantization states or taps to slow down or delay the phase of data sampling clock 66 such that it matches input data signal 64. In operation, first phase multiplexor 56 and first phase averaging circuit 58 typically decreases data sampling clock 66 by one phase quantization state or tap after a plurality of phase offsets, preferably a minimum of sixteen 16 transitions, indicate data sampling clock 66 is early relative to input data signal 64.

The control codes 68 generated by state machine 54 thus allow selection from an n-number of possible phase quantizations or selections. State machine 54 provides control codes 68 for phase shifting data sampling clock 66 when necessary. For example, for filter jitter reduction circuit 40 having thirty-two phase quantization states or taps, eight possible phase selections are available for the first phase multiplexor 56 and four possible averaging inputs are available for the first phase averaging circuit 58. Control codes 68 may be encoded into a five bit binary number, "00000" through "11111", which represents the phase quantization state or tap. State machine 54 provides control code 68 to first phase multiplexor 56 and first phase averaging circuit 58. Three bits of five bit control code 68 are utilized to control first phase multiplexor 56 and the remaining two bits of control code 68 are utilized to control first phase averaging circuit 58. First phase multiplexor 56 includes eight inputs, each input receiving synthesized clock signal 72 having a different phase generated by VCO 48. Selected input clock 102 from first phase multiplexor 56 represents one of the eight inputs, chosen by control code 68. Selected input clock 102 is then applied to first phase averaging circuit 58, which under the control of control code 68 averages selected input clocks 102 to produce data sampling clock 66.

In accordance with the present invention, control codes 68 are applied to digital filter 42, where they are processed or filtered and applied to second phase multiplexor 60 and second phase averaging circuit 62. Reduced jitter output clock 44 is then generated and applied to clock input of output data latch 46 which re-times input data signal 64. Since the instantaneous frequency of input data sampling clock 66 and reduced jitter output clock 44 are not necessarily equal, digital filter 42 combined with output data latch 46 performs the function of an elastic buffer, thereby reducing output jitter. The high frequency components of jitter are rejected, whereas the low frequency components of jitter are tracked and minimized by the present invention.

Control for second phase multiplexor 60 and second phase averaging circuit 62 is provided by digital filter 42, which initially determines the phase difference between data sampling clock 66 and reduced jitter output clock 44. Thus, the current phase selections of data sampling clock 66 and current reduced jitter output clock 44 are compared. Digital filter 42 generates filtered control codes 70 which provides for further precessing of reduced jitter output clock 44 when the difference between the phase selections of data sampling clock 66 and reduced jitter output clock 44 exceeds a predetermined tracking range m. Filtered control codes 70 allow precession of reduced jitter output clock 44 in the same direction as data sampling clock 66 to maintain generally the same maximum separation when the phase difference exceeds tracking range m. When the difference between the current phase selections of data sampling clock 66 and reduced jitter output clock 44 is equal to or less than tracking range m, filtered control code 70 does not provide for further precessing of reduced jitter output clock 44. In such case, the current phase selection for reduced jitter output clock 44 is maintained.

The value of tracking range m may be determined in accordance with a number of factors, including but not limited to, the speed of logic circuits utilized to realize the present invention and the time between data bits in input data signal 64. Digital filter 42 minimizes low frequency jitter, which typically manifests itself by causing precession in one direction followed by precession in the other direction. Reducing or eliminating the cyclic precession effectively attenuates jitter. The level of attenuation depends upon the exact implementation of the technique and the amplitude of the input jitter. Generally, for peak-to-peak jitter below a positive and negative tracking range m-tap precession, the jitter attenuation is infinity, whereas for large jitter magnitude, the jitter attenuation will be small.

In a typical implementation, digital filter 42 has a tracking range or bandwidth of m=+/−4, that is, within +/− four tap attenuation levels, all low frequency jitter tracked by filter jitter reduction circuit 40 is generally attenuated such that jitter accumulation cannot occur. During operation, data sampling clock 66 precesses back and forth to track a sinusoidal input jitter having a certain magnitude. Unless data sampling clock 66 for input data signal 64 is more than +/−4/32 or +/−4 taps of the current clock, the same tap is maintained. Digital filter 42 thus performs the function of an elastic buffer because at any given point in time, the number of data bits that are held between data sampling latch 50 and output data latch 46 is not a constant. Reduced jitter output clock 44 is generated and attenuates all jitter within input data signal 64 to recover clock jitter bandwidth to a maximum of +/−4/32 of a unit interval or +/−4/32 of a tap. If input data signal 64 is at a higher frequency than VCO 48, VCO 48 continuously precesses in order to synthesize a higher frequency. If VCO 48 precesses more than 4/32 of a unit interval in one direction, digital filter 42 will precess in the same direction to catch up with VCO 48, thus preventing VCO 48 from stepping back and forth. One skilled in the art will recognize that the tracking range m (i.e. bandwidth) of digital filter 42 can be adjusted to accommodate the particular needs of a system. The precessing increment and allowable tap offset can be changed accordingly.

Digital filter 42 thus provides filtered control codes 70 for phase shifting reduced jitter output clock 44 when the difference between phase selections of data sampling clock 66 and reduced jitter output clock 44 exceeds tracking range m. Filtered control codes 70 provided by digital filter 42 allow selection from an n-number of possible phase quantitizations or selections. For example, for digital filter jitter reduction circuit 40 including thirty-two phase quantization states or taps, eight possible phase selections are available for the second phase multiplexor 60 and four possible averaging inputs are available for the second phase averaging circuit 62. The filtered control code 70 may be encoded into a five bit binary number, "00000" through "11111", which represents the phase quantization state or tap. To determine the difference between the phase selections, one of the two n-bit numerical codes representing the phase selection of data sampling clock 66 or reduced jitter output clock 44 is represented in two's compliment binary form so when it is added to the other phase selection, an n-bit difference signal representing the difference between the phase selections is generated. An adder (not shown) can be used to add the current state of first phase multiplexor 56 with the two's compliment of the current state of second phase multiplexor 60. The output is the difference between the phase selections of data sampling clock 66 and reduced jitter output clock 44. Digital filter 42 generates filtered control code 70 which provides for further precessing of reduced jitter output clock 44 when the difference between the phase selections of data sampling clock 66 and reduced jitter output clock 44 exceeds a predetermined value m.

Three bits of five bit filtered control code 70 are utilized to control second phase multiplexor 60 and the remaining two bits of filtered control code 70 are utilized to control second phase averaging circuit 62. Second phase multiplexor 60 includes eight inputs, each input receiving synthesized clock signal 72 having a different phase generated by VCO 48. Selected input clock 104 from second phase multiplexor 60 represents one of the eight inputs, chosen by filtered control code 70. Selected output clock 104 is then applied to second phase averaging circuit 62, which under the control of filtered control code 70 averages selected output clocks 104 to produce reduced jitter output clock 44.

Figure 4:
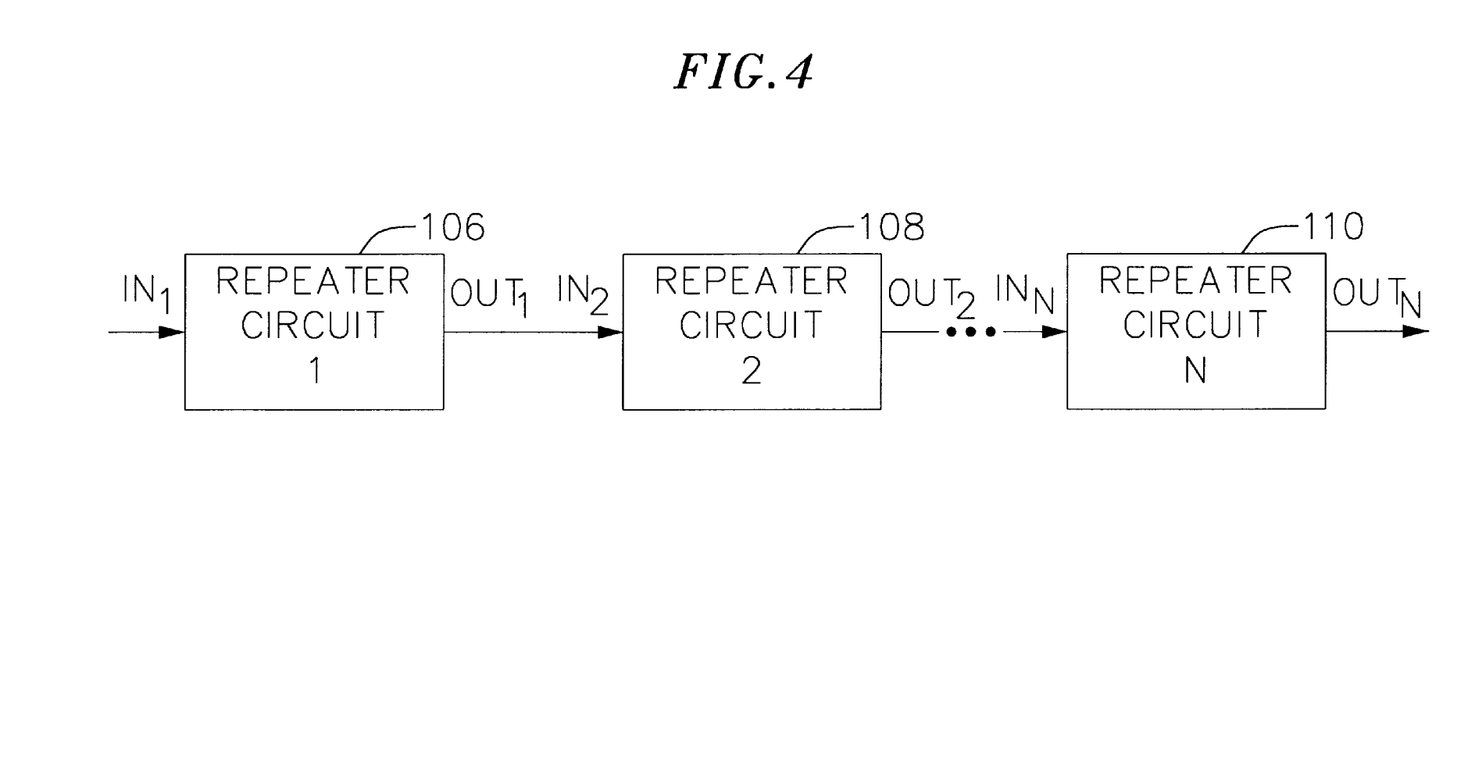
FIG. 4 is a block diagram of several stages of digital filter jitter reduction circuit implemented in cascade to further reduce jitter.

Referring to FIG. 4, in accordance with the present invention, multiple stages of digital filter jitter reduction circuit 40 may be advantageously cascaded to further reduce jitter transfer. Repeater circuits$_{1-N}$ 106, 108 and 110 are cascaded, with each repeater circuit 106, 108 and 110 including digital filter jitter reduction circuit 10 (FIG. 1) or 40 (FIG. 2). The output of each repeater circuit is applied to the input of a subsequent repeater circuit, with each stage providing for further jitter transfer reduction. Only a single high frequency clock in each repeater circuit 106, 108 and 110 is synthesized whereas all other clocks, such as reduced jitter output clock 44 (FIG. 2), are created by precessing or phase shifting with respect to single high frequency clock. The amount of power consumption is thus minimized. This becomes very important when digital filter jitter reduction circuit 10 or 40 is implemented in a repeater chip and the number of repeaters increase. For example, for a dual repeater chip, four high-speed clocks are needed, all of which may be synthesized from a single high-speed clock utilizing the concepts of the present invention.

The benefits of the present invention thus includes reduced power consumption, size, cost and complexity. Since the jitter attenuation is a function of the input jitter amplitude, digital filter 42 of the present invention is non-linear in nature. Moreover, the present invention may be implemented in hardware, software or a combination thereof.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A jitter reduction circuit for attenuating jitter associated with a signal, comprising:

means for generating a first clock and a second clock;

phase comparing means for comparing a phase of said first clock with a phase of said signal and adjusting said phase of said first clock in response thereto;

means for determining relative phase offset between said first clock and said second clock and selectively changing a phase of said second clock when said phase offset exceeds a tracking range; and means for re-timing said signal according to said second clock.

2. The jitter reduction circuit claimed in claim 1, wherein said means for selectively changing the phase of said second clock when said phase offset exceeds the tracking range, comprises:

means for adjusting said phase of said second clock by a predetermined amount.

3. The jitter reduction circuit claimed in claim 2, wherein said means for adjusting said phase of said second clock by the predetermined amount, comprises:

means for adjusting said second clock by said predetermined amount in a direction following said phase offset.

4. The jitter reduction circuit claimed in claim 2, wherein said means for adjusting said phase of said second clock by the predetermined amount, comprises:

a digital filter for generating control codes which adjusts said phase of said second clock by said predetermined amount.

5. The jitter reduction circuit claimed in claim 4, wherein said digital filter is non-linear.

6. The jitter reduction circuit claimed in claim 4, wherein said predetermined amount is adjustable.

7. The jitter reduction circuit claimed in claim 4, wherein said jitter reduction circuit can be cascaded for increased jitter attenuation.

8. The jitter reduction circuit claimed in claim 4, where in said means for adjusting said phase of said second clock by the predetermined amount, further comprises:

multiplexing means, responsive to said means for generating said second clock and said control codes, for selecting said phase of said second clock.

9. The jitter reduction circuit claimed in claim 8, wherein said means for adjusting said phase of said second clock by the predetermined amount, further comprises:

phase averaging means, responsive to said multiplexing means and said control codes, for averaging said selected phase of said second clock.

10. The jitter reduction circuit claimed in claim 4, wherein said digital filter and said second clock elastically buffer said signal from jitter.

11. The jitter reduction circuit claimed in claim 4, wherein said means for adjusting phase of said second clock by the predetermined amount, further comprises:

variable phase shifting means, responsive to said means for generating said first clock and said second clock and said control codes, for selecting said phase of said second clock.

12. The jitter reduction circuit claimed in claim 1, wherein said signal is encoded in non-return to zero (NRZ) format.

13. The jitter reduction circuit claimed in claim 1, wherein said tracking range is adjustable.

14. The jitter reduction circuit claimed in claim 1, wherein said phase comparing means for comparing the phase of said first clock with the phase of said signal and adjusting said phase of said first clock in response thereto, comprises:

means for comparing at least one phase of a transition of said signal with at least one phase of a transition of said first clock and generating a phase offset amount in response thereto; and means for adjusting said phase of said first clock in response to said phase offset.

15. The jitter reduction circuit claimed in claim 14, wherein said means for adjusting said phase of said first clock in response to said phase offset, comprises:

a state machine for generating a control code for adjusting said phase of said first clock in response to said phase offset.

16. The jitter reduction circuit claimed in claim 1, wherein said means for generating the first clock and the second clock comprises a local oscillating means.

17. A method for attenuating jitter associated with a signal, comprising the steps of:

generating a first clock and a second clock;

comparing a phase of said first clock with a phase of said signal and adjusting said phase of said first clock in response thereto;

determining relative phase offset between said first clock and said second clock and selectively changing a phase of said second clock when said phase offset exceeds a tracking range; and re-timing said signal according to said second clock.

18. The method claimed in claim 17, wherein selectively changing the phase of said second clock when said phase offset exceeds said tracking range, comprises the step of:

adjusting said phase of said second clock by a predetermined amount.

19. The method claimed in claim 18, wherein said step of adjusting said phase of said second clock by the predetermined amount, comprises the step of:

adjusting said second clock by said predetermined amount in a direction following said phase offset.

20. The method claimed in claim 18, wherein said step of adjusting said phase of said second clock by the predetermined amount, comprises the step of:

generating control codes which adjust said phase of said second clock by said predetermined amount.

21. The method claimed in claim 17, wherein said step of selectively changing the phase of said second clock when said phase offset exceeds the tracking range, comprises the step of:

selecting said phase of said second clock using control codes generated as a response to comparing the phase of said first clock with the phase of said signal.

22. The method claimed in claim 21, wherein said step of selectively changing the phase of said second clock when said phase offset exceeds the tracking range, further comprises the step of:

averaging said selected phase of said second clock.

23. The method claimed in claim 21, wherein said step of selecting said phase of said second clock using control codes, comprises the step of:

phase shifting said phase of said second clock in response to said control codes.

24. The method claimed in claim 17, wherein said steps of comparing the phase of said first clock with the phase of said signal and adjusting said phase of said first clock in response thereto, comprise the steps of:

comparing at least one phase of a transition of said signal with at least one phase of a transition of said first clock and generating a phase offset amount in response thereto; and adjusting said phase of said first clock in response to said phase offset amount.

* * * * *